United States Patent Office

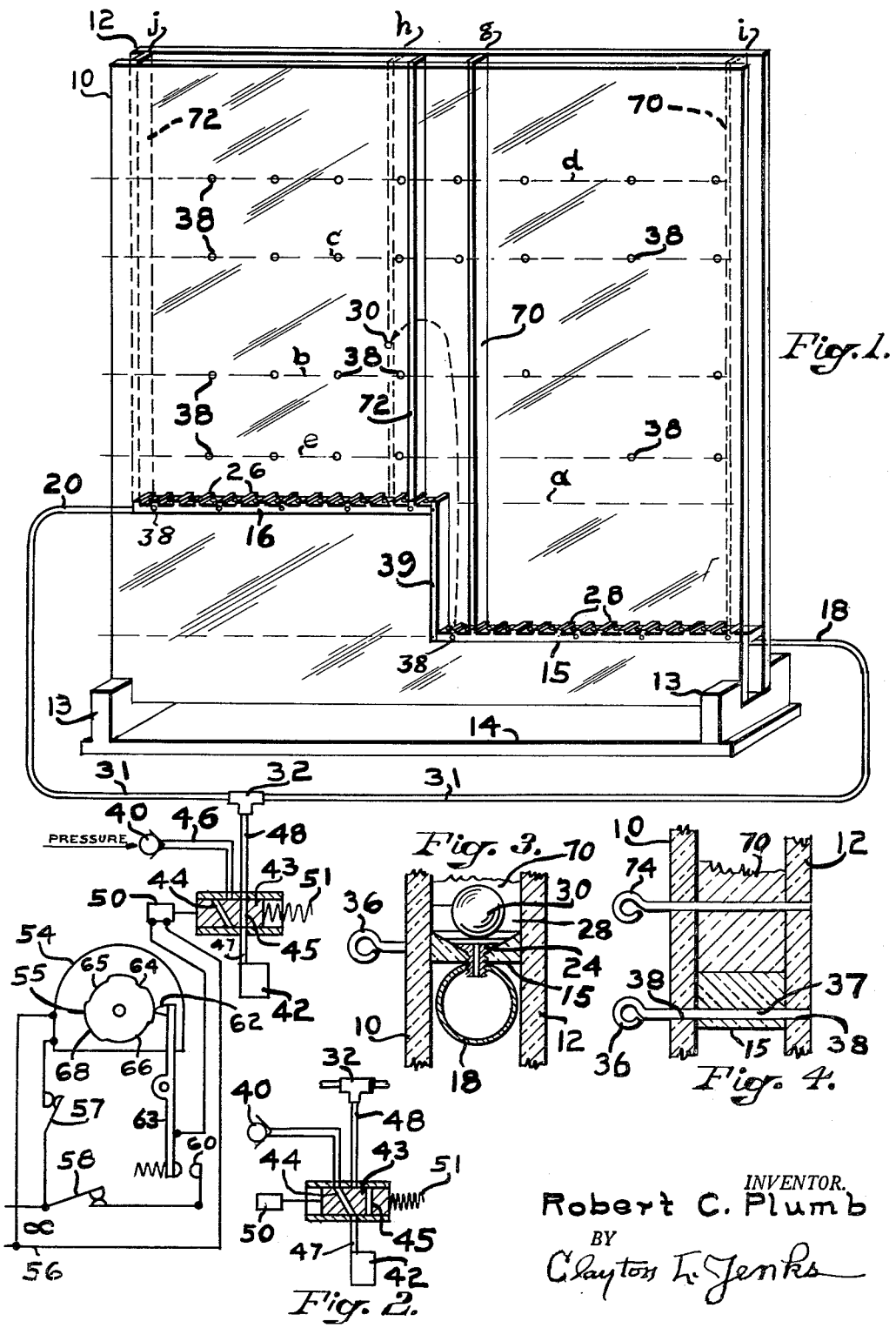

3,209,470
Patented Oct. 5, 1965

3,209,470
EDUCATIONAL APPARATUS FOR DEMONSTRATING THE ENTROPY CONCEPT
Robert C. Plumb, Millward St., Charlton, Mass.
Filed Aug. 19, 1963, Ser. No. 302,990
6 Claims. (Cl. 35—19)

This invention pertains to apparatus for demonstrating entropy effects upon the behavior of matter.

There are two approaches which may be used in dealing with the entropy concept. One of these, that of classical thermodynamics, does not consider the detailed atomistic nature of matter. Rather, it provides a phenomenological description of a bulk system capable of absorbing heat or doing work, without considering how the heat or work affects the molecular properties of the system. A change of entropy, $dS$, is thus defined in terms of the heat flow into a system, $dq$, by the relation $$dS \geq \frac{dq}{T}$$

where $T$ is the absolute temperature and the inequality applies to irreversible processes and the equality to reversible processes. The work done by a system, $dw$, and the heat absorbed by a system determine the change in internal energy of a system $dU$ according to $$dU = dq - dw \leq TdS - dw$$

It is convenient to define other thermodynamic variables: the enthalpy $H = U + PV$, where $P$ and $V$ are pressure and volume,
the Helmholtz free energy $A = U - TS$,
and the Gibbs free energy $G = H - TS$.

One important use of thermodynamics is in predicting the direction of spontaneous change of a system. Systems at constant pressure and temperature tend to change in such a way that the Gibbs free energy approaches its minimum value. That is, if $dG$ is negative for a change in the state of a system, the change tends to occur spontaneously. Since $$dG = dU + PdV - TdS$$

this means that a decrease in internal energy $U$, a decrease in volume $V$, or an increase in entropy $S$, will favor a change in the state of a system.

In order to predict the direction of spontaneous change of a system from classical thermodynamics, it is necessary to have experimentally measured values of the internal energy $U$ and entropy $S$ in both the initial and final states of the system. Using the approach of statistical thermodynamics, and statistical mechanics, one can predict many of the thermodynamic quantities from a knowledge of the mechanical behavior of the discrete particles which make up a system. The thermodynamic properties must be associated with mechanical properties of the particles. Particles in a system possess kinetic energy as a result of their motions and potential energy as a result of the forces which they exert on each other. The classical thermodynamic internal energy $U$ is the sum of these two types of energy.

Entropy, as a mechanical phenomenon, is related to the randomness in arrangement in particles in the system. The randomness is with respect to the positions of distinguishable particles and with respect to the occupation of energy levels. Designating possible distinguishable arrangements of the system by the subscript $i$ and the fraction of the time that the system is in one of these arrangements by $f_i$, entropy is defined as $$S = -k \Sigma_i f_i \ln f_i$$

where $k$ is the Boltzmann constant of $1.375 \times 10^{-16}$ ergs per degree and ln refers to the natural logarithm. In a particular system in which there are $W$ distinct arrangements, all having equal a priori probability, the entropy expression takes the particularly simple form $$S = k \ln W$$

Systems consisting of a collection of particles have a tendency to adjust their internal motions or positions so as to make the potential energy of the system a minimum. From this principle, one can explain and predict the direction of spontaneous change in many macroscopic and microscopic systems, but this does not provide a complete basis for understanding the mechanical behavior of matter and is sufficient only in the absence of entropy effects. There are, in fact, many systems which will go spontaneously from a state of low potential energy to a state of high potential energy as a result of entropy effects.

It is convenient to think of entropy as a driving force causing a change in the arrangement of particles in a system and which may compete with or augment the driving force of potential energy. In the absence of a potential energy driving force, a system tends to go spontaneously toward the state of the system which has the largest randomness or entropy. Entropy as a driving force is operative only if energy is available which may be used to overcome the potential energy driving forces of a system. This energy is customarily available in the form of the kinetic energy of atoms and molecules which increases with increasing temperature.

The primary object of my invention is to provide an educational apparatus for demonstrating the entropy concept.

Another object is to provide a demonstration apparatus in which one or more freely movable balls may be given kinetic energy in an irregular manner so as to simulate the way in which atoms or molecules get kinetic energy by collision with other particles and which has an arrangement of two levels at different elevations in the earth's gravitational field for providing states of different potential energy to be occupied by the ball at different times, and wherein provision is made for varying the randomness of the position of the ball in either of the levels by movable barriers, thereby providing states of different and variable entropy. Other objects will be apparent in the following disclosure.

A simple mechanical device for demonstrating the concept of entropy is shown in the accompanying drawings, in which:

FIG. 1 is a perspective view of the apparatus, but with the operating mechanism shown diagrammatically, and wherein the control valve is positioned for discharging air from a reservoir to the jet nozzles;

FIG. 2 is a diagrammatic view of the operating valve mechanism showing the valve positioned for charging the reservoir;

FIG. 3 is a fragmentary transverse section through the vertical walls showing the air duct and an ejector nozzle for impelling the ball upwardly; and FIG. 4 is a section similar to FIG. 3 which shows the pins for holding in position a vertical barrier and a horizontal deck member.

The structure illustrated comprises two vertical spaced walls 10 and 12, the front wall 10 being made of transparent material, such as Plexiglas synthetic resin, and the rear weall 12 may be made of similar or other suitable material. The walls are suitably sized and substantially rectangular. They are mounted on a suitable support, such as standards 13 carried by a table or horizontal member 14. The walls are parallel and spaced sufficiently to provide room for the movement of a small ball therebetween. Slidably fitted between the spaced walls are two horizontal deck-like members 15 and 16 arranged respectively to carry two pipes or air ducts 18 and 20 for conveying compressed air or other gas. The deck 15 is fixed in position, while the other deck 16 is movable vertically.

As shown in FIG. 3, each of the pipes 18 and 20, which may be made of brass or other suitable material, has a series of equally spaced, vertical, threaded holes arranged in alignment on the top of the pipe. A screw threaded nozzle 24 having a vertical hole therethrough is threaded through the horizontal deck 15 or 16 into each of these holes in the brass pipe. The deck is counter sunk to fit the tapered nozzle head. The holes through the nozzles are equally sized in diameter to provide similar jets of air issuing therefrom. The deck structure 16 is provided with a set of low partitions 26, and the deck 15 has similar partitions 28. These partitions are so spaced between adjacent nozzles 24 and the tops of the nozzles are so shaped that a light weight ball 30 will be properly located over an associated jet stream when it happens to fall into place between two adjacent partitions. The ball 30 may be spherical or otherwise shaped, and the partition 26 is merely high enough to locate the ball over the jet. The ball may be made of cellular air filled "Styrofoam" resinoid plastic or other suitable light weight material and it may be about ½ inch in diameter, or as desired.

The deck member 15, as hereinafter explained, simulates a low potential energy level. The deck 16 is adjustably mounted at a higher level, so that it simulates, with reference to the gravitational field of the earth, a variable higher potential energy level. That is, if the ball 30 is located on the upper level deck 16, it has a greater potential energy due to gravity than if it is at rest on the lower level deck 15.

Each of the pipes 18 and 20 is connected through a flexible hose 31 with T coupling 32 which in turn is connected with a source of compressed air of suitable pressure, such as 80 pounds per square inch, which is modulated by a control valve. Hence, all of the jets issuing simultaneously from the two pipes 18 and 20 provide substantially the same kinetic energy momentarily to drive the ball upwardly. If the freely movable ball 30 starts on the lower energy level 15, it may fall back onto the same level, or it may be driven somewhat laterally and come to rest on the upper level 16. The ball always falls into position over an air jet, and the next puff of air from the associated jet nozzle may cause the ball to drop back to the same level or the ball may come to rest in one of the various pockets on the other level. A trajectory of the ball is indicated by the dotted line in FIG. 1.

The upper potential energy level deck 16 is adjustable to various heights, and this may be accomplished by means of a pair of pins 36 (FIG. 4) arranged to be passed through holes 37 in the deck and aligned holes 38 in the front wall 10 (FIG. 1) and the back wall 12. The movable deck 16 may be positioned as shown in level $a$ (FIG. 1) or it may be located in other levels $b$ or $c$, as indicated by the horizontal dotted lines passing through the pin holes. The decks 15 and 16 extend horizontally from opposite ends of the container formed by the walls 10 and 12, and their adjacent ends terminate near a common vertical plane and so provide free access for a ball which may move laterally in its trajectory. A vertical partition 39 of required height is suitably arranged in that plane between the adjacent ends of the two deck structures 15 and 16 to prevent the ball 30 from escaping beneath the upper level deck.

The light weight ball 30 may be driven in various trajectories by air jets or pulses delivered intermittently by suitable mechanism. The ball may simulate a molecule subjected to a pulse of kinetic energy represented by the air jet. In order that there may be a Maxwellian distribution of kinetic energy at a particular temperature, I have provided mechanism for regulating the air jet pulses so as to provide three different strengths of pulse in sequence which will drive the ball upwardly towards three different levels. Of the various mechanisms which may be employed for furnishing the varied jets, I prefer that illustrated, in which compressed air derived from a suitable source is admitted through a precisely adjustable inlet needle valve 40 which regulates the kinetic energy imparted by the jet. This valve simulates a control of temperature which governs the kinetic energy that drives a molecule.

The compressed air is passed periodically into a small storage chamber 42 where it is held by a normally closed two-way magnetic control valve. This chamber is small so as to provide jets of required force. It may be a closed end pipe of 1 inch diameter and a few inches long. It is desired that the air pulse be quick acting and that the pulse duration be short; hence the magnetic valve is opened and closed rapidly. This two-way valve, which may be of suitable construction, may be a Humphrey "Electro-pact" valve, capable of admitting air under pressure to the storage reservoir 42 and then discharging the stored air quickly into the T coupling 32 from which it passes to the jet nozzles. This valve comprises a slide member 43 having two passages 44 and 45 arranged respectively to connect the inlet supply pipe line 46 through passage 44 with the pipe 47 leading to the reservoir 42, as shown in FIG. 2, or when the slide valve is moved to the position of FIG. 1, then the reservoir pipe outlet 47 is connected through the valve duct 45 with the pipe 48 which leads to the T coupling 32. The slide valve may be pushed in one direction by an electromagnet 50 and in the opposite direction by a compression spring 51.

The valve controlling magnet 50 is energized by means of a mechanism shown in FIG. 1 comprising a constant speed electric motor 54 which drives at suitable speed a cam plate or disk 55 mounted on its shaft. The cam plate has three depressions of different length which form the operating cam surfaces spaced by high cylindrical surfaces on the plate. The power line 56 which connects with the motor 54 through a control switch 57 is connected with the magnet through a shunt circuit including a manual control switch 58. A normally open microswitch 60 is located in this shunt line and it is closed by the cam plate 55 moving the cam follower 62 mounted on one end of the first class lever arm 63 which carries the movable contact of the microswitch on the other end. When the cam follower 62 falls into the short length cam slot 64 on the rotating cam plate 55, the microswitch is closed for a very short period of time, and the slide valve 43 is pushed to cause compressed air to feed into the storage tank 42 for that short period of time and so develops only a low pressure in the reservoir. The cam plate has a slot 65 of longer length and a further slot 66 that is still longer. Hence, when the microswitch cam follower falls into one of those slots, the microswitch is triggered to cause air to be admitted to the reservoir for two other periods of time of greater lengths. When the cam follower is on one of the high cylindrical surfaces 68 of the cam, the magnet 50 is de-energized, and then the spring 51 thrusts the slide plate toward the left and so connects the reservoir with the jet supply tubes 31. This operation therefore involves supplying the reservoir 42 with three different gas charges or pressures, so that as the cam plate revolves, three jets of air are furnished to drive the ball upwardly to three different heights. This control mechanism gives an approximation of a Maxwellian distribution of kinetic energy and provides three pulses of different kinetic energies each of an exponentially decaying character. The valve 40 is adjusted during a demonstration to vary the jet air pulses from minimum, representing a low temperature, up to a maximum within the capacity of the device, to give the ball a high trajectory, as representing the more violent molecular action at a high temperature.

As above stated, entropy is related to the randomness in arrangement of particles in a system. That randomness may therefore be considered as pertaining to the room or space provided for molecular motion. In a given quantity of material, there will be a distribution of velocities or of kinetic energy. A particular molecule undergoes changes in velocity and kinetic energy as a result of collision with other molecules. As the temperature is increased the average value of the kinetic energy increases. The potential energy difference between states is represented in terms of the height of the upper level above the lower level in the earth's gravitational field. Whether the ball representing a molecule stays on a given level as it plays on the jets is determined largely by the spatial extent of that level. Hence, I have provided movable barriers to define the boundaries of the levels in which the ball 30 may play. To this end, I provide the two vertical partitions or barriers 70 and 72 which may be moved horizontally to various vertical positions. They are held in place by means of a pair of pins 74 (FIG. 4) thrust into a pair of vertically aligned holes 38 in the two rows of holes arranged horizontally on the lines of $d$ and $e$. Hence, the vertical barriers which slidably fit between the two wall plates 10 and 12 may be adjusted as desired to provide wide or narrow spaces on the upper and lower levels and so govern the freedom of play of the ball under the jet action.

In operation, the motor cam speed is regulated to give the ball time to make each trajectory and come to rest over any one of the nozzles before the jets are ejected, and the valve 40 is regulated to give the desired force. In its action of playing on the jets intermittently, the ball is given variable kinetic energy, analagous to surroundings of variable temperature, and its movement, particularly its movement from one potential energy level to another, is noted as the three variables, a parameter simulating temperature, the randomness of the different potential energy levels, and the difference between potential energy levels, are varied. The number of times the ball falls on each level is counted during a demonstration.

The mechanical behavior of the ball will be dependent upon the positions of the vertical barriers, and the horizontal level or deck 16 and the kinetic energy pulses. Three sets of cases describing how the ball behaves for particular arrangements are given below:

A. When the vertical barriers 70 and 72 are in the near positions $g$ and $h$ equidistant from the vertical plane of partition 39, (as indicated in FIG. 1) or when they are in the remote positions of $i$ and $j$, and if the deck 16 is located on level $a$ as shown in full lines, and assuming that the ball is receiving kinetic energy impulses the average magnitude of which is equal to that of the potential energy difference between the positions $b$ and $c$ so that the ball will be shot above the level of the upper deck, then the ball will spend an equal amount of time in each of the two states represented by the two decks.

B. When the vertical barriers are in positions $g$ and $h$ (or $i$ and $j$), the deck 16 is in the higher position $b$ and the average kinetic energy impulse applied to the ball is the same as in case A, then the ball will spend somewhat more time in the lower level than in the upper level. Not all of the pulses are strong enough to drive the ball to the upper deck 16.

C. When the vertical barriers are in position $g$ and $h$ (or $i$ and $j$), the horizontal deck 16 is in position $c$ and the average kinetic energy impulse applied to the ball is the same as in the previous two cases then the ball will spend considerably more time on the lower energy level than on the upper level.

The above three cases illustrate how potential energy driving forces tend to control the state of the system.

D. When the vertical barriers are in $g$ and $h$, the deck 16 is in position $b$ and the average kinetic energy impulse is about the same as the potential energy difference between the states or deck levels the ball will spend somewhat more time in the state of lower potential energy of the lower deck 15, since the barrier position $h$ does not provide sufficient space on the upper level (a low entropy).

E. When the vertical barriers are in positions $g$ and $j$, the horizontal deck 16 is in position $b$ and the average kinetic energy impulse is about the same as the potential energy difference between the states or deck levels the ball will spend much more time in the state of higher potential energy of the upper deck, since the barrier position $j$ provides space for the ball to play on the jets of the upper deck (a high entropy).

Cases D and E illustrate how an entropy driving force tends to make the system go toward a state of large entropy. In the upper state, the entropy is $S = k \ln w_u$ and in the lower state the entropy is $S = k \ln w_l$ where $w_u$ and $w_l$ are the number of positions available for the ball in the upper and lower states respectively.

F. When the vertical barriers are at positions $g$ and $j$, the horizontal deck is in position $b$ (higher than $a$) and the average kinetic energy pulse is about equal to the potential energy difference between the states, the ball spends most of its time in the upper state, because of larger space (high entropy).

G. When the vertical barriers are at $g$ and $j$ and the horizontal deck 16 is in position $b$ and the average kinetic energy is small, much less than in case F, as provided by partially closing the temperature simulating valve 40, the ball tends to spend most of the time in the lower potential energy state.

The last two cases (F and G), illustrate how potential energy and entropy driving forces may compete with each other and how temperature influences the effect of entropy as a driving force. If sufficient kinetic energy is available (high temperature) then entropy effects are dominant. If little kinetic energy is available (low temperature) then potential energy effects are dominant.

There are many examples of behavior of chemical and physical systems which are illustrated by this device. As one particular example, consider a test tube half filled with water and stoppered. This is illustrated by moving the barriers 70 and 72 close together. Water tends to evaporate from the liquid to the gaseous state, but the gaseous state is at a higher potential energy since the bonds holding water molecules to each other must be broken when the water evaporates. The state of the system is determined, in this case, primarily by potential energy driving forces. Hence, the evaporation is at a minimum. Consider now that the quantity of water is transferred to a very large container filled with air. This is shown by moving barrier 72 to position $j$. The water will evaporate, forming water vapor. The water evaporates because in the large container, more positions are available in the gaseous state for the water molecules. The entropy of the gaseous state has been increased and the entropy driving force causes the water to evaporate. In evaporating, the entropy driving force has overcome a potential energy driving force which tends to make the water molecules stick to each other. At very low temperatures, the water would not evaporate in the large container even though the entropy driving force were favorable because the molecules would not have sufficient kinetic energy to overcome the potential energy of attraction between molecules in the liquid state. This is illustrated by closing the needle valve 40.

The apparatus can therefore be manipulated to demonstrate the various relationships of entropy and the forces of kinetic and potential energy. It will be appreciated that various modifications of the apparatus may be made within the scope of this invention and that the above disclosure of a preferred embodiment is not to be interpreted as imposing limitations on the appended claims.

Having thus described my invention, what I claim is:

1. An educational apparatus for demonstrating the entropy concept comprising a container having two parallel rear and front walls, the front one being transparent, two horizontal decks of different heights between the container walls which project from opposite ends of the container to positions where their adjacent ends are in a vertical plane and which provide different potential energy levels, a ball free to move among available positions on the two levels, said container having two vertical barriers mounted respectively above the two decks and located between the walls for restricting the number of available positions for the ball to occupy on each potential energy level deck, said barriers being so spaced from said plane as to permit the ball to have limited access to both decks, and means for subjecting the ball intermittently to pulses of dissimilar kinetic energy which are capable of impelling the ball upwardly from its position on either deck.

2. Apparatus according to claim 1 in which one of said horizontal decks is vertically adjustable and comprising means for holding said member in a vertically adjusted position.

3. Apparatus according to claim 1 comprising means for holding said barriers in laterally adjusted positions in several vertical planes.

4. Apparatus according to claim 1 in which said means comprises a source of compressed gas and a controlling valve therefor, horizontal ducts communicating with said source which are respectively located on the energy level decks, each of said ducts having upwardly opening, spaced nozzles for impelling the ball upwardly, means for locating the ball above any of the available nozzles and valve mechanism for causing said gas to issue intermittently as pulses.

5. Apparatus according to claim 4 in which the valve mechanism for providing the pulses comprises an adjustable valve for controlling the gas flow from said source, a reservoir for said compressed gas, and mechanism including a two-way control valve governing the flow of gas to said reservoir and the discharge of gas from said reservoir to the ducts.

6. Apparatus according to claim 5 in which the two-way control valve mechanism comprises a synchronous motor, a member rotated by said motor which has different cam surfaces, a source of electrical power, means including a micro-switch for said power which is triggered by said cam surfaces and means including an electro-magnet governed by the microswitch which controls said two-way valve and provides the intermittent gas pulses.

References Cited by the Examiner
UNITED STATES PATENTS

| | | | |
|---|---|---|---|
| 744,630 | 11/03 | Schneider | 273—96 |
| 790,894 | 5/05 | Henricksen | 273—95.3 |
| 1,350,542 | 8/20 | Booth | 40—106.25 |
| 2,537,628 | 1/51 | Hanson et al. | 35—24 XR |
| 2,935,176 | 5/60 | Lorenzen | 46—44 XR |

EUGENE R. CAPOZIO, *Primary Examiner.*

JEROME SCHNALL, *Examiner.*